US012640459B1

(12) United States Patent
Li et al.

(10) Patent No.: US 12,640,459 B1
(45) Date of Patent: May 26, 2026

(54) ANTENNA INSTALLED IN HEAT DISSIPATION VENT

(71) Applicant: HONGBO WIRELESS COMMUNICATION TECHNOLOGY CO., LTD., Taipei City (TW)

(72) Inventors: Chia-Tien Li, Taipei City (TW); Hong-Fang Yan, Taipei City (TW)

(73) Assignee: HONGBO WIRELESS COMMUNICATION TECHNOLOGY CO., LTD., Taipei City (TW)

( * ) Notice: Subject to any disclaimer, the term of this patent is extended or adjusted under 35 U.S.C. 154(b) by 61 days.

(21) Appl. No.: 18/956,400

(22) Filed: Nov. 22, 2024

(51) Int. Cl.

| | |
|---|---|
| ***H01Q 1/48*** | (2006.01) |
| ***H01Q 1/22*** | (2006.01) |
| ***H01Q 5/20*** | (2015.01) |
| ***H05K 7/20*** | (2006.01) |

(52) U.S. Cl.
CPC ............. *H01Q 1/2266* (2013.01); *H01Q 1/48* (2013.01); *H01Q 5/20* (2015.01)

(58) Field of Classification Search
CPC .......... H01Q 1/241; H01Q 1/243; H01Q 1/48; H01Q 1/50; H01Q 1/52; H01Q 5/20; H01Q 1/22; H01Q 1/2258; G06F 1/203; H05K 7/20; H05K 7/20154
See application file for complete search history.

(56) References Cited

U.S. PATENT DOCUMENTS

2010/0073853 A1* 3/2010 Suzuki .................. G06F 1/1616 361/679.01
2021/0234258 A1* 7/2021 Islam ........................ H01Q 1/02
2023/0178875 A1* 6/2023 Wu ........................... H01Q 1/48 343/702
2025/0007163 A1* 1/2025 Fang ...................... H01Q 5/385

FOREIGN PATENT DOCUMENTS

CN 118659113 A * 9/2024 ......... H05K 7/20145
CN 119133848 A * 12/2024 ............. G06F 1/203

* cited by examiner

*Primary Examiner* — Thai Pham
(74) *Attorney, Agent, or Firm* — Li & Cai Intellectual Property (USA) Office

(57) ABSTRACT

An antenna installed in a heat dissipation vent includes a heat dissipation frame, a main antenna body, and an auxiliary antenna body. The heat dissipation frame has a plurality of first openings and a plurality of second openings. The main antenna body has a main antenna pattern and a plurality of first alignment openings. The first alignment openings are aligned with the first openings, and are bonded to the heat dissipation frame. The auxiliary antenna body has an auxiliary antenna pattern and a plurality of second alignment openings. The second alignment openings are aligned with the second openings, and are bonded to the heat dissipation frame. Accordingly, an integration degree of a heat sink and an antenna component can be improved.

10 Claims, 11 Drawing Sheets

ANTENNA INSTALLED IN HEAT DISSIPATION VENT

FIELD OF THE DISCLOSURE

The present disclosure relates to an antenna module, and more particularly to an antenna installed in a heat dissipation vent.

BACKGROUND OF THE DISCLOSURE

A mobile terminal device is not only developed toward being smaller and lighter, but is also expected to have high performance. For business or consumer use, a handheld mobile phone (cell phone) is limited by a device size, and thus cannot achieve the performance of a desktop computer. Other types of the mobile terminal device (e.g., a notebook computer, a laptop computer, and a tablet computer) can have the performance similar to that of the desktop computer.

However, high performance indicates high power usage. Since more electricity needs to be used for achieving greater performance, waste heat generated during operation of electronic components is also increased. In order to reduce an increasing component temperature (which is caused by waste heat generated during working of an electronic device), active air circulation is usually applied for heat dissipation. While a fan can be used inside a device, at least one heat dissipation vent is even more needed to discharge hot air outside of the device. For a conventional heat sink, integration is usually carried out only with respect to the appearance of the device for purposes of visual aesthetics, and any cooperation with the performance function of the device is not provided.

SUMMARY OF THE DISCLOSURE

In response to the above-referenced problem of a heat sink having a single function, the present disclosure provides an antenna installed in a heat dissipation vent, so as to integrate the antenna that takes up much space and is used as a transmitting and receiving port (or a transmitting and receiving area) of electromagnetic energy into the heat sink and increase an integration degree of the heat sink and an antenna component. Accordingly, an overall integration degree of essential components of a device can be improved.

In order to solve the above-mentioned problem, one of the technical aspects adopted by the present disclosure is to provide an antenna installed in a heat dissipation vent, which includes a heat dissipation frame, a main antenna body, and an auxiliary antenna body. The heat dissipation frame has a plurality of first openings and a plurality of second openings. The main antenna body has a main antenna pattern and a plurality of first alignment openings. The first alignment openings are aligned with the first openings, and are bonded to the heat dissipation frame. The auxiliary antenna body has an auxiliary antenna pattern and a plurality of second alignment openings. The second alignment openings are aligned with the second openings, and are bonded to the heat dissipation frame.

Therefore, in the antenna installed in the heat dissipation vent provided by the present disclosure, the antenna is integrated into the heat dissipation vent, so as to increase the integration degree of the components. In addition, since the heat dissipation vent has a large space, a shielding effect of the metal of a device body can be reduced, and antenna performance can be enhanced, thereby resulting in great industrial application values.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
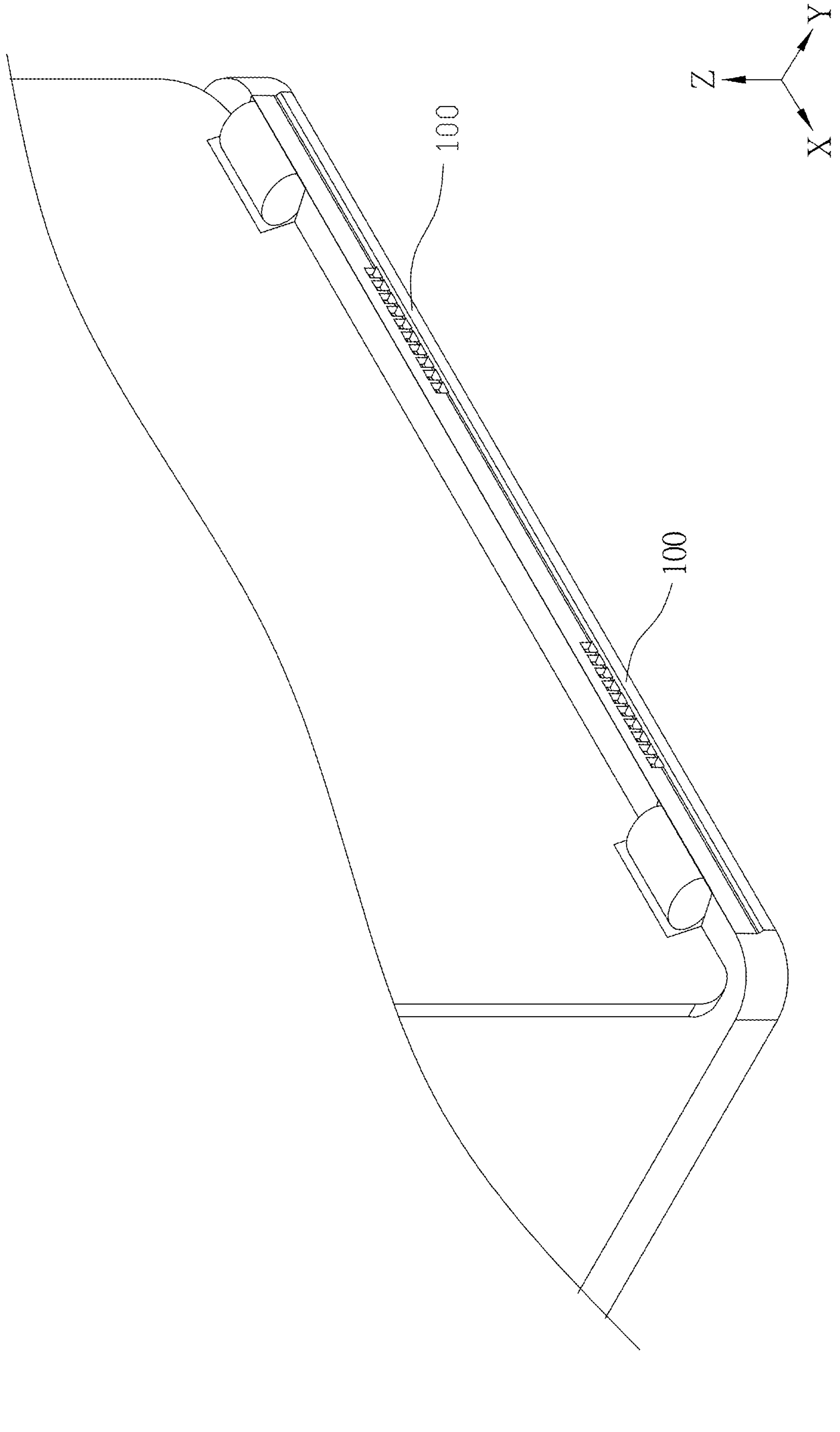
FIG. 1 is a schematic view showing a position of a heat dissipation vent on a notebook computer according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
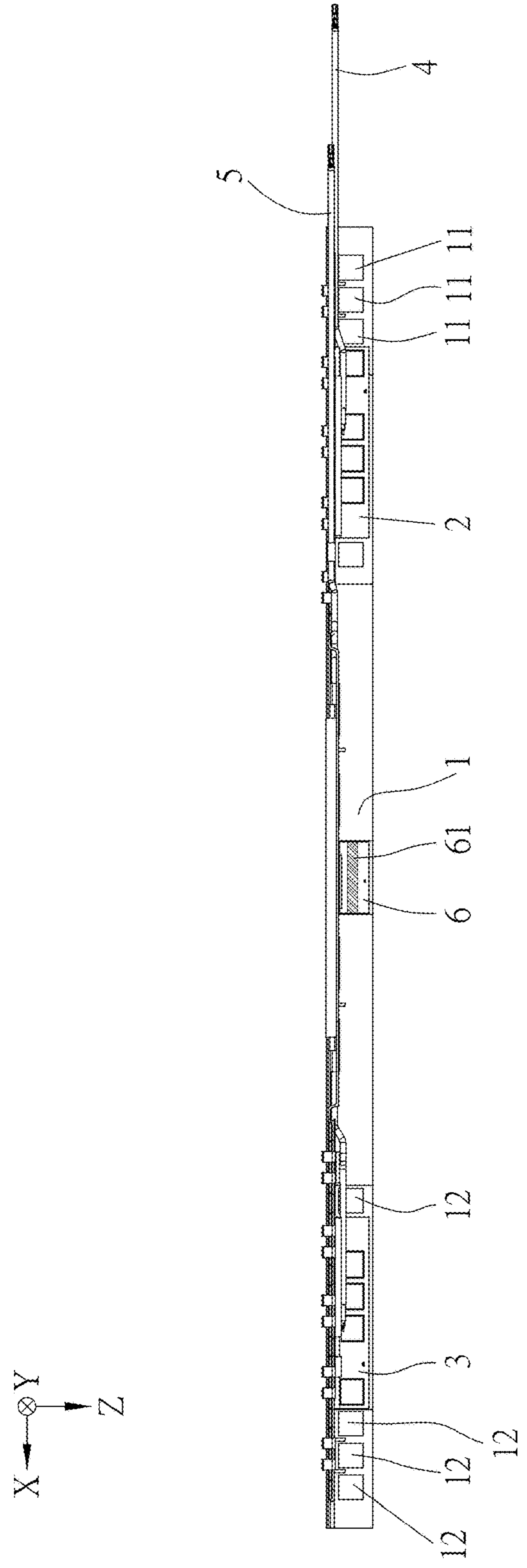
FIG. 2 is a schematic top view of an antenna installed in the heat dissipation vent according to one embodiment of the present disclosure.
Figure 3:
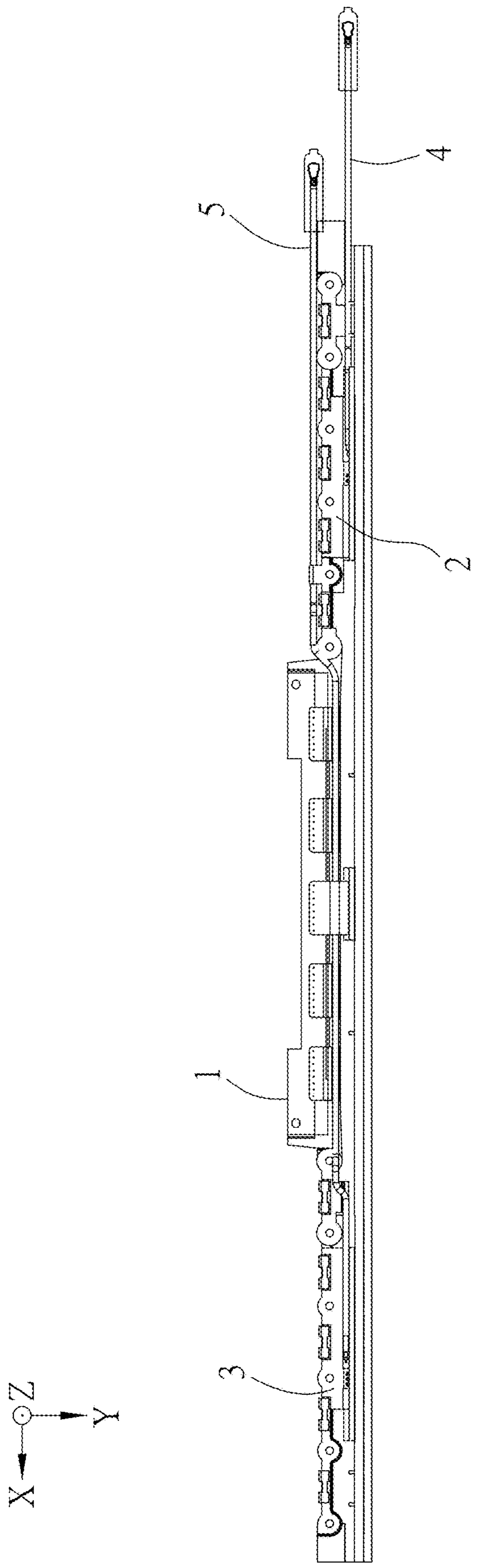
FIG. 3 is a schematic front view of the antenna installed in the heat dissipation vent according to one embodiment of the present disclosure.
Figure 9:
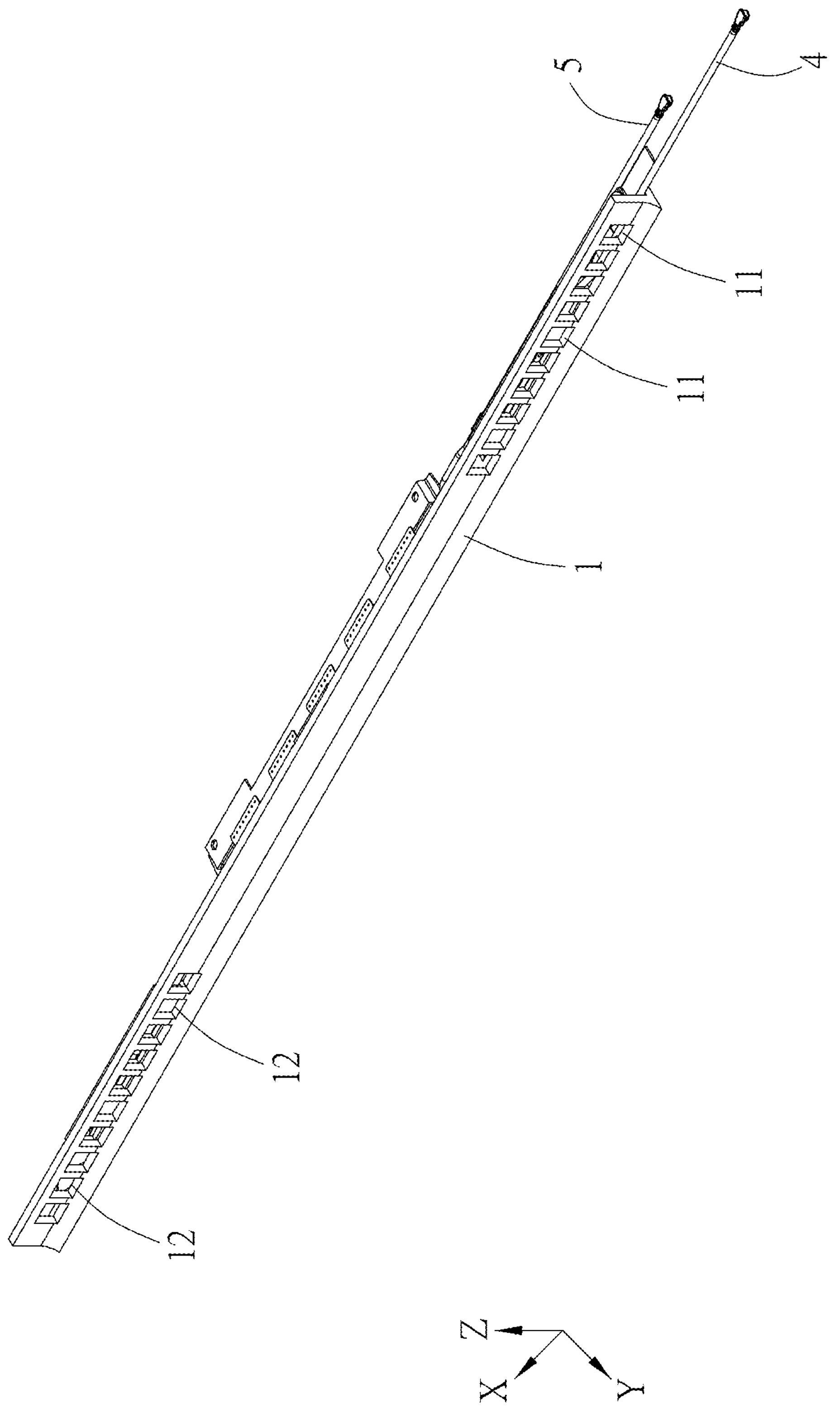
FIG. 9 is a schematic perspective view showing a rear side of the antenna installed in the heat dissipation vent according to one embodiment of the present disclosure at the inclined viewing angle.
Figure 10:
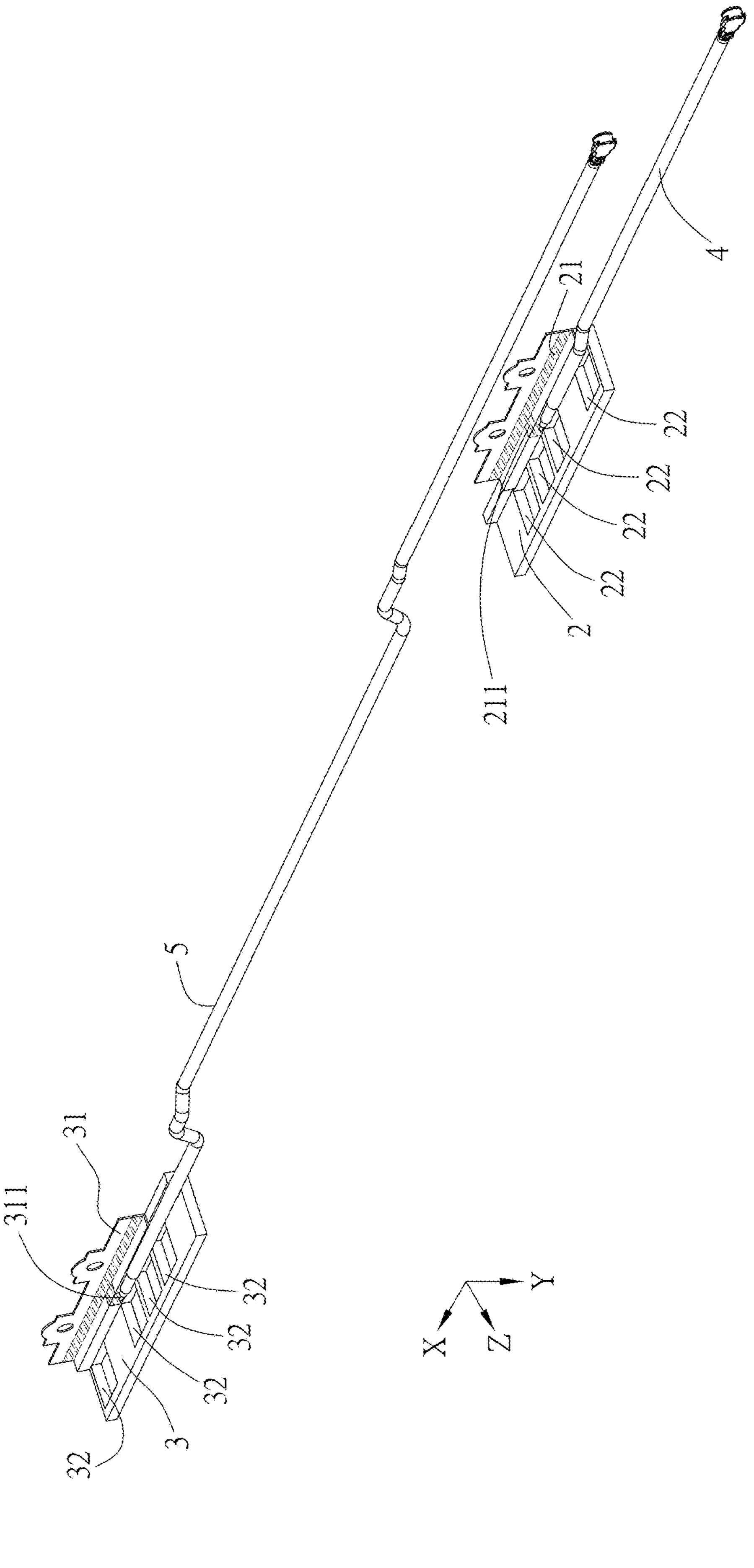
FIG. 10 is a schematic view showing a status of feed lines of a main antenna body and an auxiliary antenna body of the antenna installed in the heat dissipation vent according to one embodiment of the present disclosure.
Figure 11:
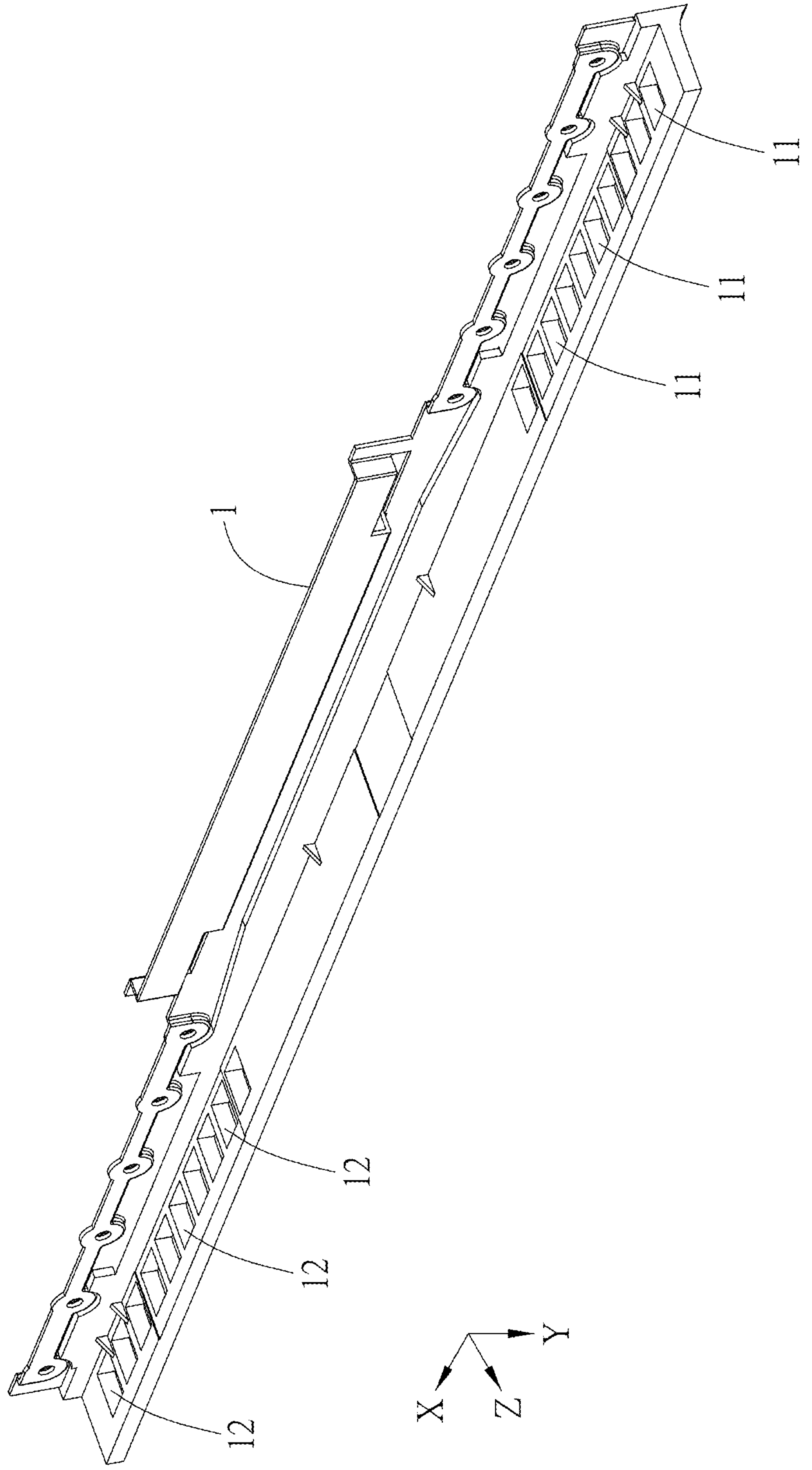
FIG. 11 is a schematic view of a heat dissipation frame of the antenna installed in the heat dissipation vent according to one embodiment of the present disclosure.

Reference is made to FIG. 1 to FIG. 11. In the following descriptions, an antenna installed in a heat dissipation vent provided in one embodiment of the present disclosure is described based on the drawings. FIG. 1 is a schematic view showing a position 100 of the heat dissipation vent on a notebook computer according to one embodiment of the present disclosure. In order not to negatively affect user experience, the heat dissipation vent is usually disposed at a position where the hand of a user does not touch. For example, the heat dissipation vent is disposed near a connection part between a rotational shaft of a computer case and a screen. However, the present disclosure is not limited thereto. In FIG. 1, an X-axis is parallel to an edge of a chassis and the rotational shaft, and a positive Y-axis (+Y) represents an outward direction (away from a machine body) with respect to the heat dissipation vent and is also an output direction of heat dissipation airflow. In addition, by virtue of the right-hand rule, a Z-axis is defined based on the X- and Y-axes. FIG. 11 is a schematic view of a heat dissipation frame 1 of the antenna installed in the heat dissipation vent according to one embodiment of the present disclosure. The heat dissipation frame 1 is usually non-metal, and is also a non-conductor. Reference is also made to FIG. 2, FIG. 3, and FIG. 11, in which FIG. 2 is a top view and FIG. 3 is a front view. The antenna installed in the heat dissipation vent includes the heat dissipation frame 1, a main antenna body 2, and an auxiliary antenna body 3. A top surface shown in FIG. 2 is an inner surface of the heat dissipation frame 1 when being assembled in the chassis, and FIG. 3 shows the position of said two antenna bodies and their corresponding feed lines on the heat dissipation frame 1 (details thereof will be provided below). The heat dissipation frame 1 is configured to be assembled in the notebook computer, a laptop computer, or a tablet computer. The antenna of the present embodiment is particularly suitable for the notebook computer, the laptop computer, or the tablet computer that has a metal chassis, and the antenna that is used as a transceiver of electromagnetic wave signals is integrated into a heat sink (the heat dissipation frame 1). As such, the antenna is so designed as not to use other areas of the chassis, and it is not necessary to specifically design a non-mental antenna window (which is used for transmitting and receiving electromagnetic waves) for the chassis.

Figure 4:
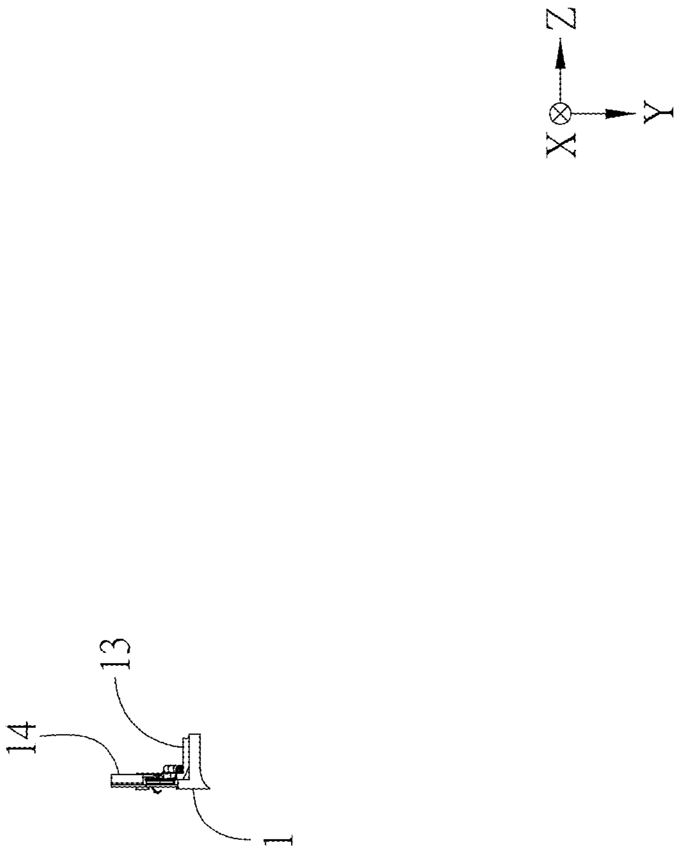
FIG. 4 is a schematic left side view of the antenna installed in the heat dissipation vent according to one embodiment of the present disclosure.
Figure 5:
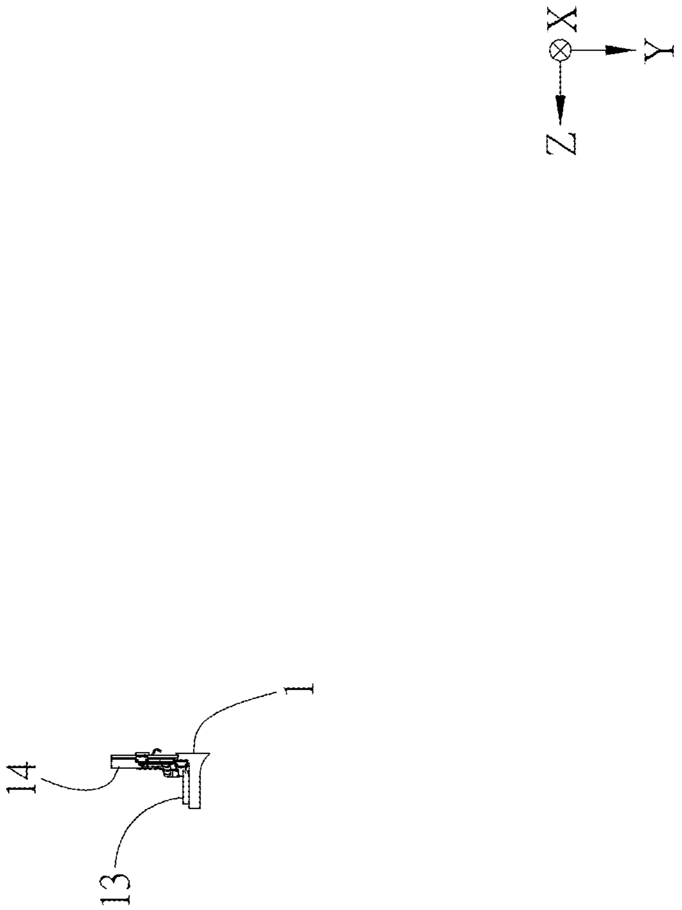
FIG. 5 is a schematic right side view of the antenna installed in the heat dissipation vent according to one embodiment of the present disclosure.

FIG. 4 is a schematic left side view of the antenna installed in the heat dissipation vent, and can also be taken as a schematic left side view of the heat dissipation frame 1. FIG. 5 is a schematic right side view of the antenna installed in the heat dissipation vent, and can also be taken as a schematic right side view of the heat dissipation frame 1. The heat dissipation frame 1 has a first inner side 13 and a second inner side 14, and the first inner side 13 is perpendicular to the second inner side 14, such that an L shape is formed by the first inner side 13 and the second inner side 14.

Figure 6:
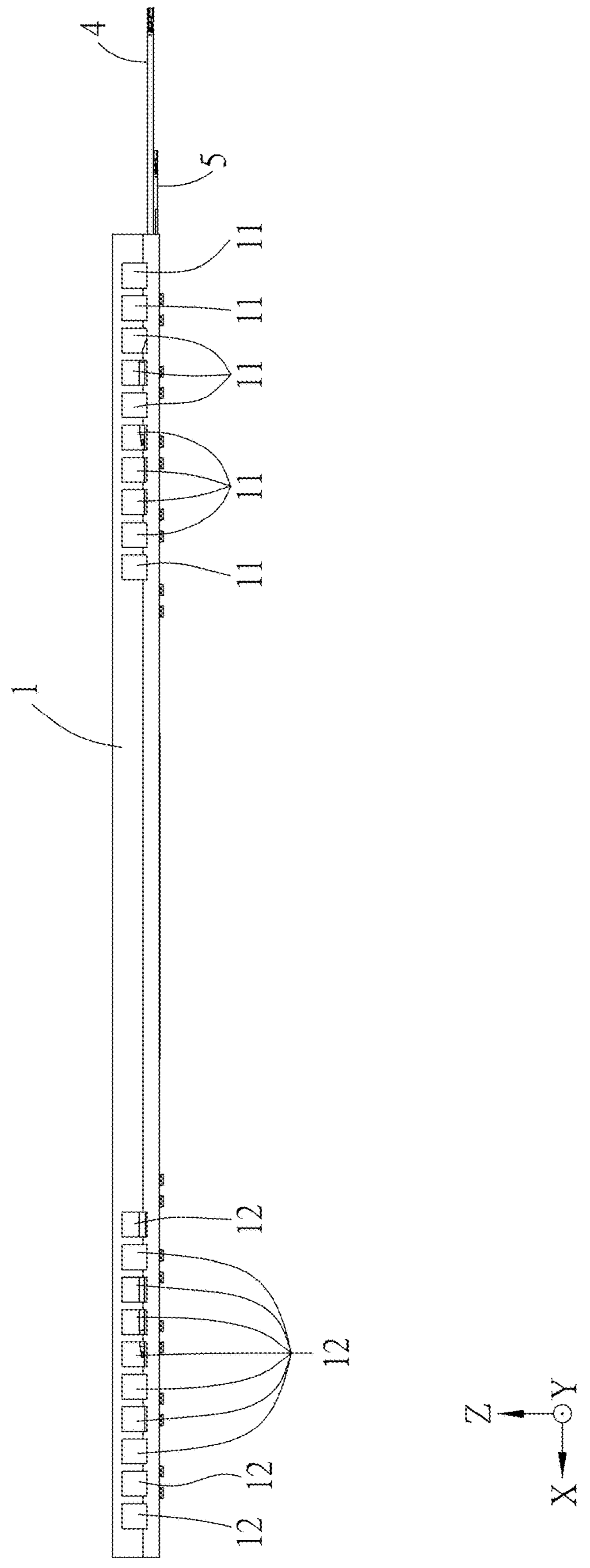
FIG. 6 is a schematic bottom view of the antenna installed in the heat dissipation vent according to one embodiment of the present disclosure.

Reference is made to FIG. 2 and FIG. 6. FIG. 6 is a bottom view, which shows a portion of the heat dissipation frame 1 that is exposed on a surface of the chassis after being assembled in the notebook computer. That is to say, a top surface of the heat dissipation frame 1 is aligned with an assembly in the machine body, and a bottom surface of the heat dissipation frame 1 after bonding can be taken as a part of the chassis (i.e., being integrated with the chassis). In the bottom view of FIG. 6, the bottom surface of the heat dissipation frame 1 (which is equivalent to a bottom surface of the antenna installed in the heat dissipation vent) has a plurality of first openings 11 and a plurality of second openings 12. These openings usually face toward an open space when the user is in a use state, such as being formed near the connection part between the rotational shaft and the screen and in a direction away from the user. When being applied to the tablet computer, these openings may change in accordance with a holding manner of the user. However, since the screen and the machine body are joined together, the openings will not be blocked by the screen in any orientation, and an outward direction with respect to the chassis is the open space. It is worth mentioning that the bottom view of the antenna in FIG. 6 actually shows a side away from the user after the antenna is assembled with the chassis and when the notebook computer is being used by the user (as shown in FIG. 1).

Figure 7:
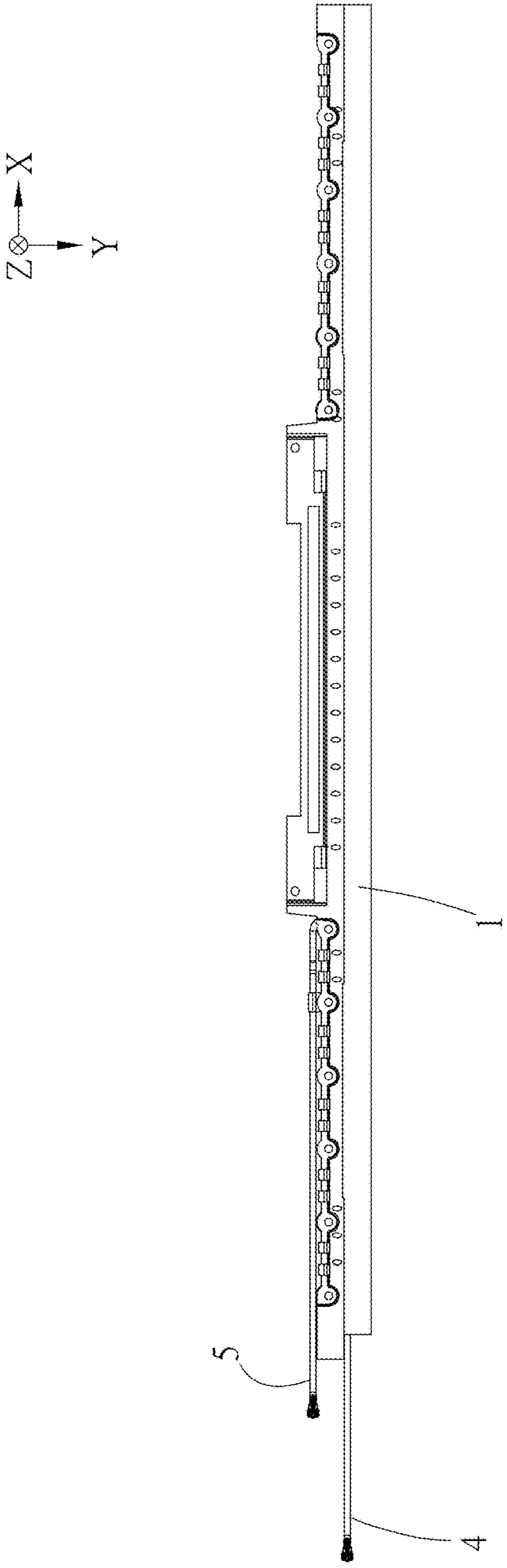
FIG. 7 is a schematic rear view of the antenna installed in the heat dissipation vent according to one embodiment of the present disclosure.
Figure 8:
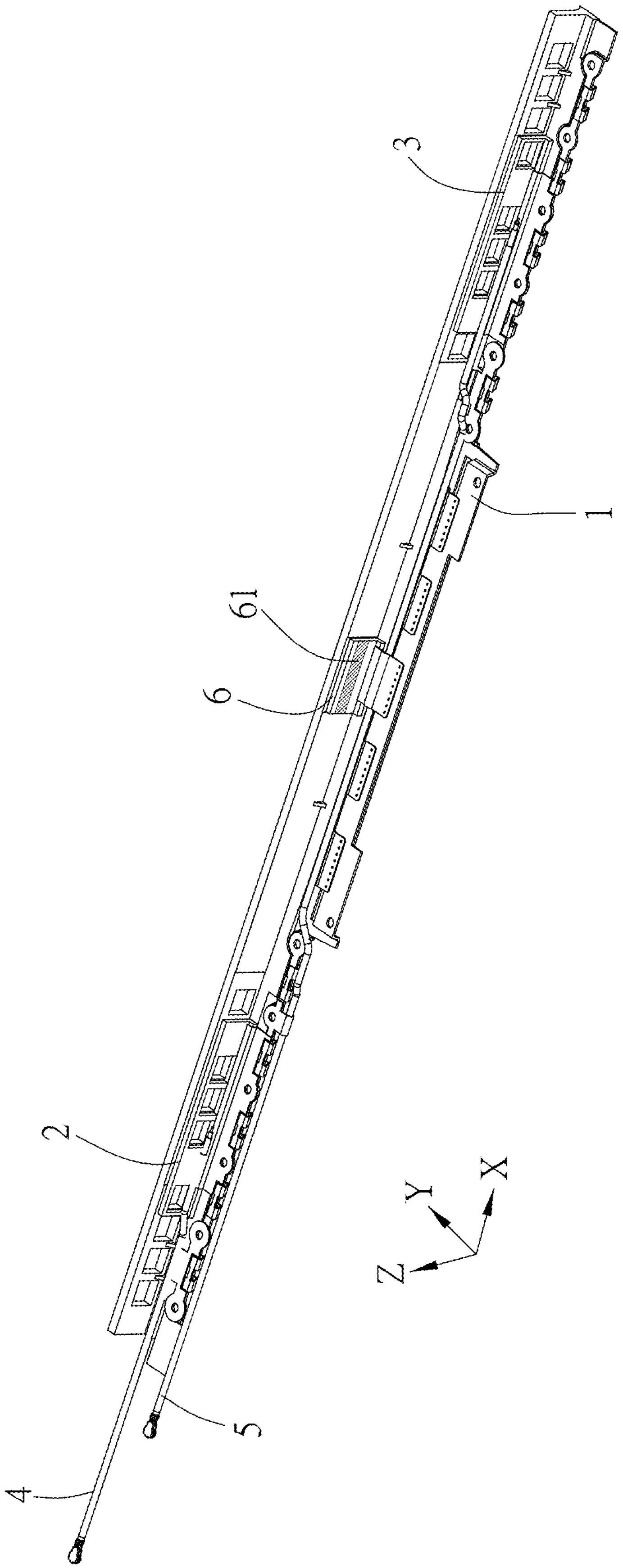
FIG. 8 is a schematic perspective view showing a front side of the antenna installed in the heat dissipation vent according to one embodiment of the present disclosure at an inclined viewing angle.

Reference is made to FIG. 7 to FIG. 9. FIG. 7 is a schematic rear view, which actually shows a bottom surface of the machine body of the notebook computer after the antenna is assembled with the chassis. FIG. 8 is a schematic perspective view showing a front side of the antenna installed in the heat dissipation vent according to one embodiment of the present disclosure at an inclined viewing angle. FIG. 9 is a schematic perspective view showing a rear side of the antenna installed in the heat dissipation vent according to one embodiment of the present disclosure at the inclined viewing angle. The general shape of the antenna of the present embodiment can be understood by referring to FIG. 2 to FIG. 9, and further details will be provided below.

Reference is made to FIG. 2 and FIG. 10. FIG. 10 only shows the relative position of the two antenna bodies and their corresponding feed lines after removal of the heat dissipation frame 1, so as to better understand the spatial structure. FIG. 10 and FIG. 11 are viewed from the same angle. It is obvious that the antenna of the present embodiment can be obtained by assembling the two antenna bodies and their corresponding feed lines in FIG. 10 with the heat dissipation frame 1 in FIG. 11. Referring to FIG. 2 and FIG. 10, the main antenna body 2 has a main antenna pattern 21 and a plurality of first alignment openings 22. The first alignment openings 22 are aligned with the first openings 11, and are bonded to the heat dissipation frame 1. The auxiliary antenna body 3 has an auxiliary antenna pattern 31 and a plurality of second alignment openings 32. The second alignment openings 32 are aligned with the second openings 12, and are bonded to the heat dissipation frame 1.

The first openings 11 and the second openings 12 are configured to enable passing of the heat dissipation airflow. In order to simplify a manufacturing process or cooperate with the designed structure and appearance, the shape of the first openings 11 can be the same as that of the second openings 12 (but is not limited thereto). The quantity of the first openings 11 and that of the second openings 12 can, for example, range from five to ten and be the same (but are not limited thereto).

Reference is made to FIG. 3 and FIG. 10. FIG. 3 is a front assembled view of the main antenna body 2, the auxiliary antenna body 3, a first coaxial cable 4, a second coaxial cable 5, and the heat dissipation frame 1. FIG. 10 shows a corresponding connection relationship between the main antenna body 2 and the first coaxial cable 4, and shows a corresponding connection relationship between the auxiliary antenna body 3 and the second coaxial cable 5. Referring to FIG. 10, the main antenna body 2 and the auxiliary antenna body 3 are each a laser engraved component, and can be designed to cooperate with the shape of the heat dissipation frame 1. In this way, an antenna product and the heat dissipation frame 1 can have an increased integration degree, and structural optimization or miniaturization can even be achieved. In the present embodiment, the main antenna body 2 and the auxiliary antenna body 3 are each joined to the heat dissipation frame 1 by hot melting, but an assembly method is not limited thereto. The main antenna pattern 21 is represented by an area marked with diagonal lines as shown in FIG. 10, and has a first feed point 211. The first feed point 211 is connected to the first coaxial cable 4. Specifically, the above-mentioned first feed point 211 is connected to a central conductor of the first coaxial cable 4, and an outer conductor of the first coaxial cable 4 is connected to a grounding system (which is a common technical means, and will not be reiterated herein). Preferably, the outer conductor of the first coaxial cable 4 is also connected to a ground component (not shown in the drawings) of the main antenna pattern 21. The grounding design of the main antenna pattern 21 usually has the matching effect and the effect of improving performance stability, but is not limited thereto. According to actual situations, there may be functional differences. The auxiliary antenna pattern 31 has a second feed point 311, and the second feed point 311 is connected to the second coaxial cable 5. Specifically, the above-mentioned second feed point 311 is connected to a central conductor of the second coaxial cable 5, and an outer conductor of the second coaxial cable 5 is connected to the grounding system (which is a common technical means, and will not be reiterated herein). Preferably, the outer conductor of the second coaxial cable 5 is also connected to a ground component (not shown in the drawings) of the auxiliary antenna pattern 31. The grounding design of the auxiliary antenna pattern 31 usually has the matching effect and the effect of improving performance stability, but is not limited thereto. According to actual situations, there may be functional differences. The first coaxial cable 4 and the second coaxial cable 5 are each fastened to the heat dissipation frame 1 by a fastener, but are not limited thereto.

Referring to FIG. 8, the antenna installed in the heat dissipation vent further includes an isolator 6. The isolator 6 has a ground metal pattern 61, and the ground metal pattern 61 is configured to enhance antenna isolation of the main antenna body 2 and the auxiliary antenna body 3. The ground metal pattern 61, the first coaxial cable 4, and the second coaxial cable 5 are common-grounded. Preferably, the ground metal pattern 61, the main antenna pattern 21, and the auxiliary antenna pattern 31 are coplanar, so as to enhance the isolation effect. However, the present disclosure is not limited thereto.

In terms of the function of the antenna, the main antenna body 2 and the auxiliary antenna body 3 are configured to operate in a wireless wide area network (WWAN), a wireless local area network (WLAN), and a 5G sub-6 frequency band that include a frequency range of from 617 MHz to 960 MHz, a frequency range of from 1,710 MHz to 2,690 MHz, a frequency range of from 3,300 MHz to 4,900 MHz, and a frequency range of from 5,100 MHz to 5,900 MHz. The above-mentioned frequency ranges are common frequency bands for wireless communication of the existing notebook computer, laptop computer, or tablet computer.

BENEFICIAL EFFECTS OF THE EMBODIMENT

In conclusion, in the antenna installed in the heat dissipation vent provided by the present disclosure, the antenna is integrated into the heat dissipation vent, so as to increase an integration degree of components. In addition, since the heat dissipation vent has a large space, a shielding effect of the metal of a device body can be reduced, and antenna performance can be enhanced. The antenna is particularly suitable for the notebook computer, the laptop computer, or the tablet computer that has the metal chassis, and has great industrial application values.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna installed in a heat dissipation vent, comprising:

a heat dissipation frame having a plurality of first openings and a plurality of second openings;

a main antenna body having a main antenna pattern and a plurality of first alignment openings, wherein the plurality of first alignment openings are aligned with the plurality of first openings, and are bonded to the heat dissipation frame; and an auxiliary antenna body having an auxiliary antenna pattern and a plurality of second alignment openings, wherein the plurality of second alignment openings are aligned with the plurality of second openings, and are bonded to the heat dissipation frame.

2. The antenna according to claim 1, wherein the heat dissipation frame is configured to be assembled in a notebook computer, a laptop computer, or a tablet computer.

3. The antenna according to claim 1, wherein the plurality of first openings and the plurality of second openings are configured to enable passing of heat dissipation airflow.

4. The antenna according to claim 1, wherein the main antenna body and the auxiliary antenna body are each a laser engraved component.

5. The antenna according to claim 1, wherein the main antenna pattern has a first feed point, and the first feed point is connected to a first coaxial cable; wherein the auxiliary antenna pattern has a second feed point, and the second feed point is connected to a second coaxial cable.

6. The antenna according to claim 5, wherein the first coaxial cable and the second coaxial cable are each fastened to the heat dissipation frame by a fastener.

7. The antenna according to claim 1, further comprising an isolator, wherein the isolator has a ground metal pattern, the ground metal pattern is configured to enhance antenna isolation of the main antenna body and the auxiliary antenna body, and the ground metal pattern, a first coaxial cable, and a second coaxial cable are common-grounded.

8. The antenna according to claim 1, wherein the main antenna body and the auxiliary antenna body are each joined to the heat dissipation frame by hot melting.

9. The antenna according to claim 1, wherein the main antenna body and the auxiliary antenna body are configured to operate in a wireless wide area network (WWAN), a wireless local area network (WLAN), and a 5G sub-6 frequency band that include a frequency range of from 617 MHz to 960 MHz, a frequency range of from 1,710 MHz to 2,690 MHz, a frequency range of from 3,300 MHz to 4,900 MHz, and a frequency range of from 5,100 MHz to 5,900 MHz.

10. The antenna according to claim 1, wherein the heat dissipation frame has a first inner side and a second inner side, and the first inner side is perpendicular to the second inner side, such that an L shape is formed by the first inner side and the second inner side.

* * * * *